Nov. 25, 1952     O. B. MERRILL     2,619,375
VEHICLE WINDOW GLASS RUN WEATHER OR TRIM STRIP
Filed Dec. 22, 1949     3 Sheets-Sheet 1
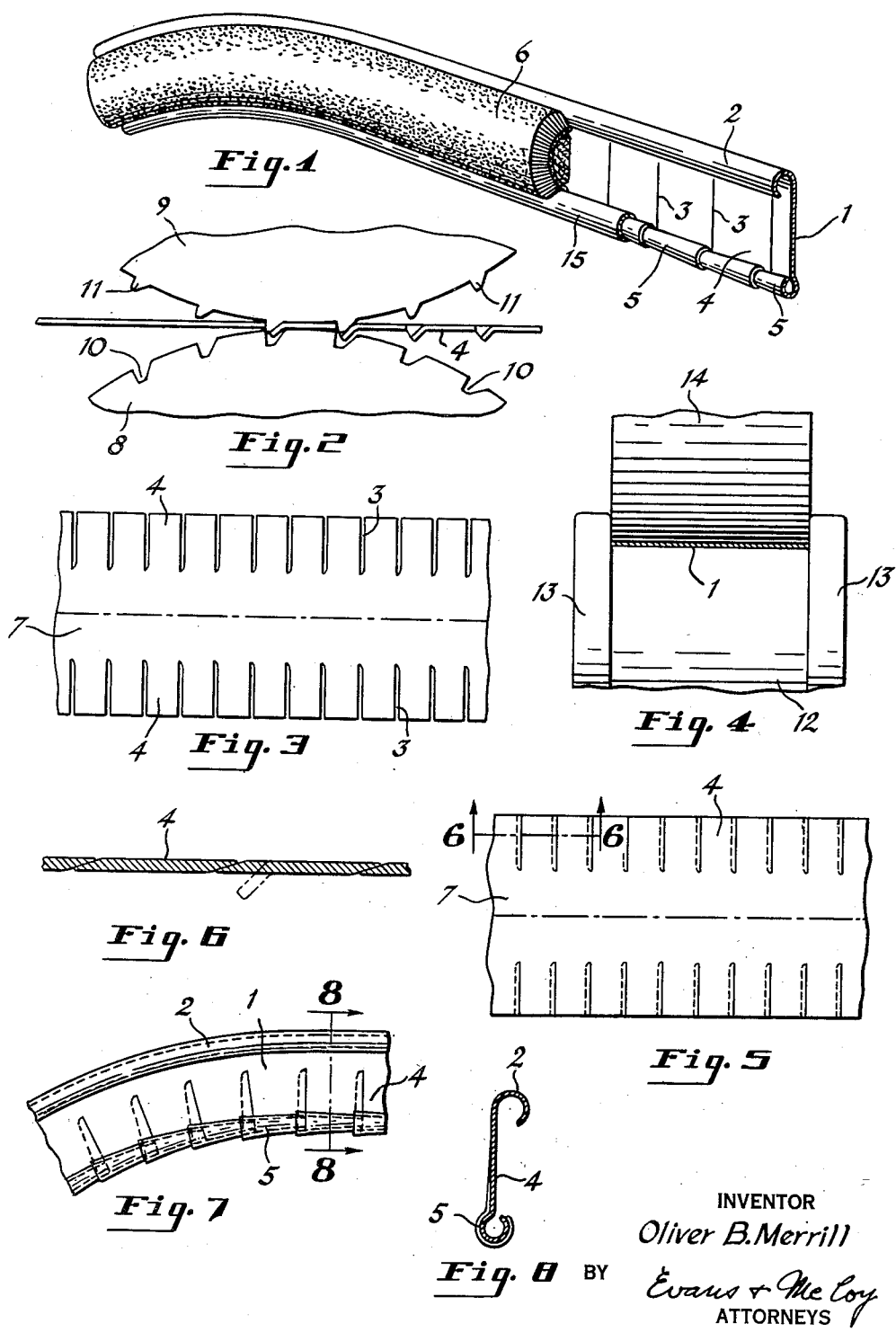
INVENTOR
Oliver B. Merrill
BY Evans & McCoy
ATTORNEYS Nov. 25, 1952     O. B. MERRILL     2,619,375
VEHICLE WINDOW GLASS RUN WEATHER OR TRIM STRIP
Filed Dec. 22, 1949     3 Sheets-Sheet 2
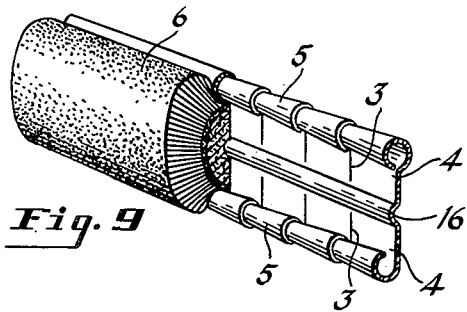
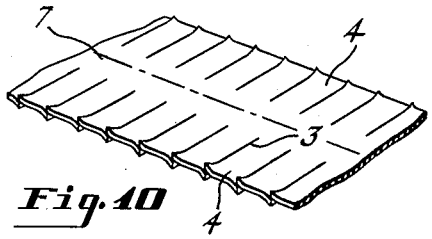
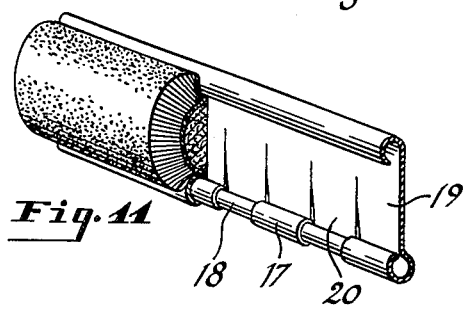
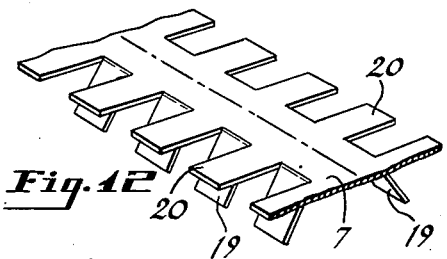
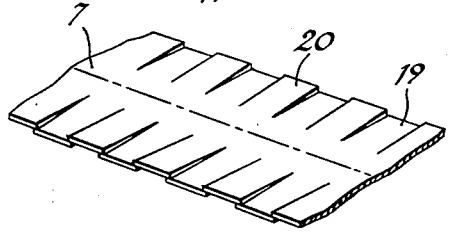
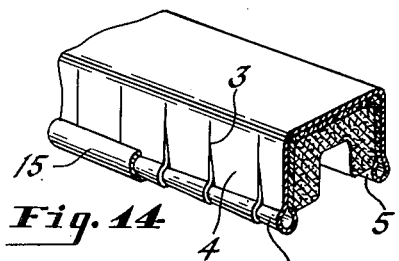
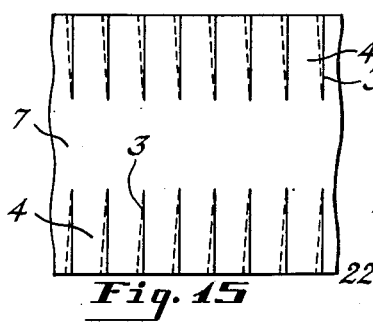
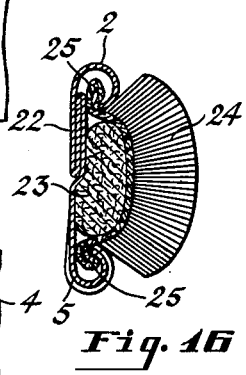
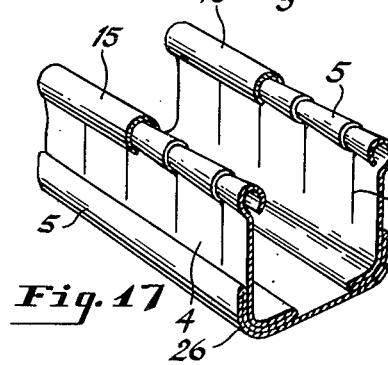
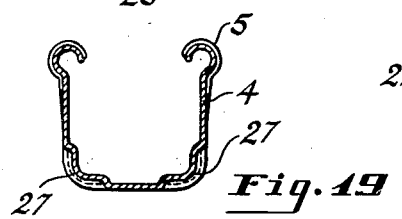
INVENTOR
Oliver B. Merrill
BY
Evans & McCoy
ATTORNEYS Nov. 25, 1952     O. B. MERRILL     2,619,375
VEHICLE WINDOW GLASS RUN WEATHER OR TRIM STRIP
Filed Dec. 22, 1949     3 Sheets-Sheet 3
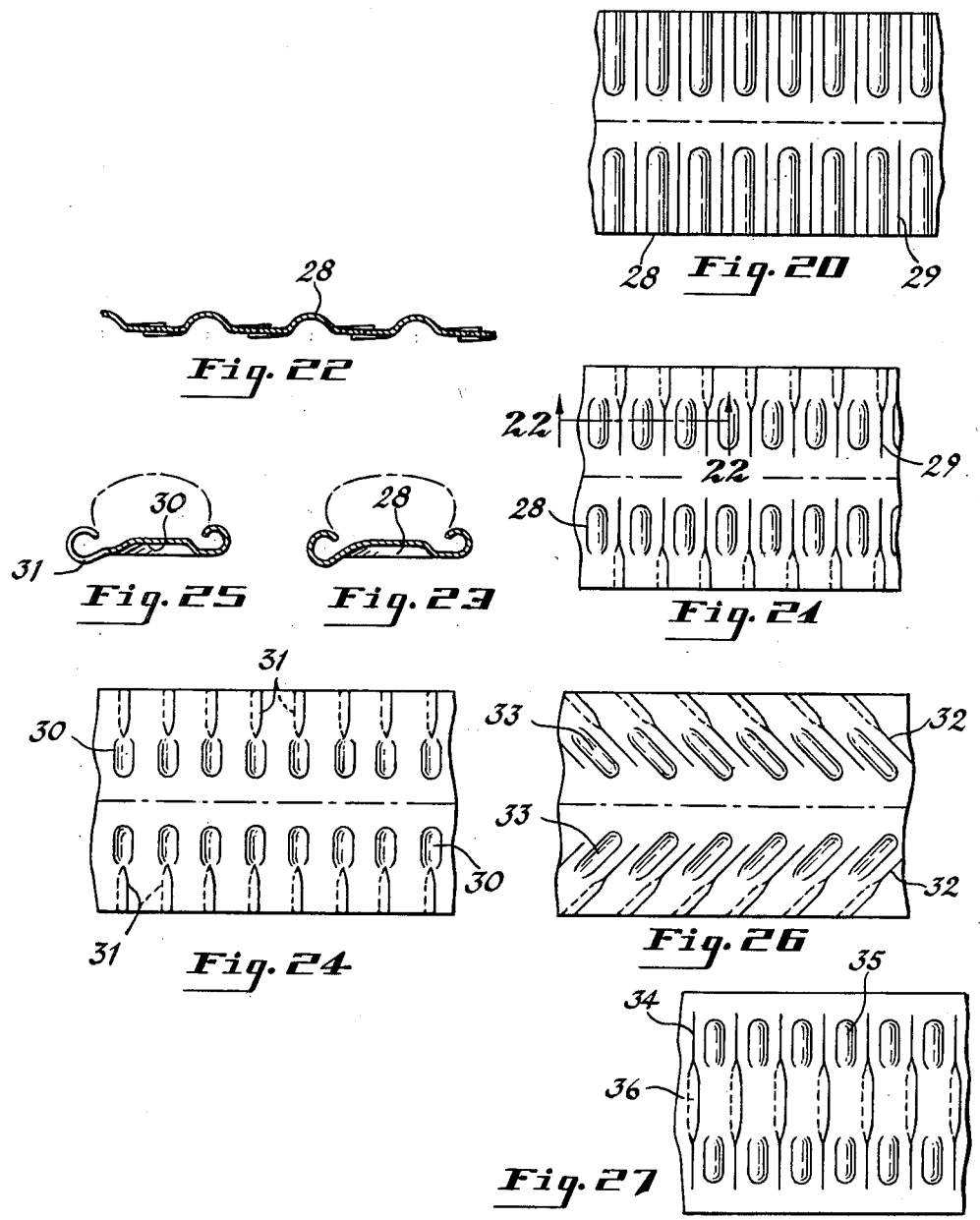
INVENTOR
Oliver B. Merrill
BY Evans & McCoy
ATTORNEYS Patented Nov. 25, 1952

2,619,375

UNITED STATES PATENT OFFICE 2,619,375

VEHICLE WINDOW GLASS RUN WEATHER OR TRIM STRIP

Oliver B. Merrill, Amesbury, Mass.

Application December 22, 1949, Serial No. 134,464

12 Claims. (Cl. 296—44.5)

This invention relates to weather or trim strips and more particularly to weather or trim strips of the type that has a portion adapted to conform to a flat surface and that is bendable in the plane of such portion to various shapes.

The invention has for its object to reduce distortion due to bending and to increase the strength and rigidity of such strips.

More specifically the invention aims to increase the strength and rigidity of weather or trim strips by providing a base strip that has a contractible edge portion composed of tongues with their side edges in lapping relation so that the tongues can slide one upon another.

It is also an object of the invention to provide a base for weather or trim strips that has a more secure grip upon the flexible sealing or trim body by reason of a continuous retaining channel along its contractible edge that is composed of telescopically connected relatively slidable sections.

With the above and other objects in view, the invention may be said to comprise the weather or trim strip as illustrated in the accompanying drawings and hereinafter described, together with such variations and modifications thereof as will be apparent to one skilled in the art to which the invention pertains.

Reference should be had to the accompanying drawings forming a part of this specification in which:

Figure 1 is a perspective view of a weather or trim strip embodying the invention;

Fig. 2 is a fragmentary view showing the strip slitting and tongue offseting operation;

Fig. 3 is a fragmentary plan view of the slitted blank from which the strip is formed;

Fig. 4 is a fragmentary view showing the tongue flattening and drawing operation;

Fig. 5 is a fragmentary plan view of a portion of the strip after the outer ends of the tongues have been drawn to increase their width;

Fig. 6 is a section taken on the line indicated at 6—6 in Fig. 5;

Fig. 7 is a side elevation of the strip having a portion thereof bent in the plane of the strip and showing the telescopic action of the channel sections formed by the outer end of the tongues;

Fig. 8 is a transverse section taken on the line indicated at 8—8 in Fig. 7;

Fig. 9 is a fragmentary perspective view showing a strip having overlapping tongues along both its edges so that each edge is contractible and the strip may be bent in either direction in its plane;

Fig. 10 is a fragmentary perspective view of the slitted blank from which the strip shown in Fig. 9 is formed;

Fig. 11 is a fragmentary perspective view of a modified construction in which both edges of each tongue overlap adjacent tongues on the same side and in which the telescopically engaging rolled ends of the tongues are substantially cylindrical in form;

Figs. 12 and 13 are fragmentary perspective views of the blank showing the same at successive stages in the process of forming the strip shown in Fig. 11, Fig. 12 showing the manner in which the tongues are initially formed and spread apart in the drawing operation, and Fig. 13 showing the tongues bent back into contact with one another;

Fig. 14 is a fragmentary perspective view of a channel shaped strip embodying the invention;

Fig. 15 is a fragmentary plan view of the blank from which the strip shown in Fig. 14 is formed;

Fig. 16 is a transverse section through a weather or trim strip of modified construction in which the body of the strip is reinforced by a longitudinally extending fold;

Fig. 17 is a fragmentary perspective view showing a bendable channel strip reinforced at the edges of the channel bottom by longitudinally extending folds;

Fig. 18 is a fragmentary side elevation of a bendable channel strip reinforced at the edges of the channel bottom by transversely extending indentations;

Fig. 19 is a transverse section taken on the line indicated at 19—19 in Fig. 18;

Fig. 20 is a plan view of a blank that has been indented and slitted to form tongues, each having a longitudinal indentation;

Fig. 21 is a plan view of the blank shown in Fig. 20 after the outer end portion of the tongues have been flattened to increase their width;

Fig. 22 is a fragmentary longitudinal section taken on the line indicated at 22—22 in Fig. 21;

Fig. 23 is a section through the finished strip formed from the blank shown in Fig. 21;

Fig. 24 is a fragmentary plan view of a slitted and indented blank of slightly modified construction;

Fig. 25 is a transverse section through the strip formed from the blank shown in Fig. 24;

Fig. 26 is a fragmentary plan view of a slitted and indented blank similar to Fig. 21 except that the slits and indentations are diagonally disposed; and Fig. 27 is a fragmentary plan view of a slitted indented blank, showing an alternative method of forming a strip such as shown in Fig. 23.

Cushioning and sealing strips such as those employed in the glass runs of automobile body windows are commonly formed with a sheet metal body to which a facing of suitable cushioning material is attached. Such strips may be flat for engagement with one side of a window pane or may be in the form of a channel adapted to receive an edge of a glass pane. In either case an essential requirement of such strips is that they be readily bendable to conform to the shape of the window opening to which they are applied. In the case of flat strips the sheet metal backing must be so formed that it is bendable in its own plane and in the case of channel shaped strips the flanges of the sheet metal channel must be so formed that they are bendable in their own plane.

The strips of the present invention are so formed that one or both edges thereof are contractible to permit bending, the contractible edge in each instance being formed by overlapping tongues which are movable one over another as the strip is bent, the same overlapping tongue structure being employed to provide contractible edges on either flat or channel shaped strips. It is to be understood, therefore, that the overlapping tongue structures and the methods of making the same herein disclosed are applicable to cushioning and sealing strips of either flat or channel form.

In the accompanying drawings Fig. 1 shows a weather strip embodying the invention which has a substantially flat body portion 1 and which has one edge bent to form a retaining channel 2. The strip is also provided with transverse slits 3 which extend transversely of the strip from the edge opposite the channel 2 and which terminate short of the channel 2. The slits 3 are regularly spaced and form a series of elongated tongues 4 which are relatively movable to provide the strip with a contractible portion that permits the strip to be bent in its plane to various desired shapes. The contractible portion of the strip formed by the tongues 4 is rolled inwardly throughout the length of the strip to provide a retaining channel 5 at the outer end of each tongue 4 which faces the channel 2, the channels 5 forming sections of a longitudinal retaining channel on the contractible side of the strip, and because of the lapping relation of the tongues the channels 5 taper longitudinally and have telescopic engagement, being slidable one within another to permit bending of the strip as shown in Fig. 7.

The sheet metal strip forms a bendable base for a sealing or trim strip of flexible material, the flexible strip 6 shown in the accompanying drawings being a sealing and cushioning strip such as commonly provided on glass run guides. The sheet metal base strip is preferably formed from a flat strip of sheet metal such as shown in Fig. 3 of the drawings, the slits 3 being formed in this sheet metal strip extending from opposite edges toward a longitudinally continuous central portion 7.

An important feature of the present invention is the provision of tongues which are widened at their outer ends so that they overlap when the strip is straight, and slide one upon another when the strip is bent. The widening of the tongues is effected by drawing the metal of each tongue to decrease its thickness and increase its width. The widening and lapping of the tongues may be effected by the slitting and rolling operations as illustrated in Figs. 2 and 4, by slitting, drawing and bending operations as illustrated in Figs. 12 and 13, or by forming indentations in the body of the strip and flattening the indentations after the slitting operation as illustrated in Figs. 20, 21, 24, 26 and 27.

A blank such as shown in Fig. 3 can be cut along its longitudinal center line to form two base strips such as shown in Fig. 1, or bent into the form of a channel such as shown in Figs. 14, 17 or 19. The slitting operation may be performed as shown in Fig. 2 by means of a pair of slitting wheels 8 and 9 provided with cutting teeth 10 and 11 which are shaped to form the slits 3 and to offset one edge of each tongue 4 angularly with respect to the continuous central portion 7.

Fig. 4 shows a roller 12 which has shoulders 13 at its opposite sides providing a circumferential channel of a width corresponding to the width of the sheet metal strip, and a roller 14 of a width to be received in the channel of the roller 12. When the sheet metal strip is passed between the wheels 8 and 9 the indented edge portions of the tongues 4 are slightly stretched so that when the tongues 4 are flattened between the rollers 12 and 14 the deflected edges of the tongues 4 will overlap the edges of adjacent tongues. By applying suitable pressure to the roller 14 the lapping edges of the tongues 4 may be drawn to increase their overlap as shown in Fig. 6.

After the slitting and drawing operations the blank may be severed along its longitudinal center line, and each of the two identical blanks so formed may be bent to provide the strip retaining channels 2 and 5.

Since the outer ends of the tongues are lapped along the collapsible edge of the strip, the retaining channel along the contractible edge is composed of tapered telescopically connected sections 5 such as shown in Figs. 1 and 7, which telescope one into another when the strip is bent as shown in Fig. 7, to concave the contractible edge of the strip.

By forming the strip with contractible portions composed of overlapping tongues, the contractible portion is longitudinally continuous and the use of a retaining strip or bead to hold the tongues in alinement is not essential. However, an ornamental covering bead 15 such as shown in Fig. 1 may be provided if desired. When a covering bead 15 is employed the telescopic connection of the channel sections 5 is advantageous in that the telescoping of the sections 5 along a bend expands the large ends of the sections 5 against the interior of the bead 15 and provides a frictional interlock that resists sliding of the bead 15 on the edge of the strip.

Since the contractible edge portion of the strip of the present invention forms a continuous retaining channel, it is feasible to form a strip in which both edges are contractible so that the strip may be bent in its plane in either direction. Fig. 9 of the drawing shows a strip having its opposite edges contractible and Fig. 10 shows the blank from which the strip is made. The strip has slits 3 extending inwardly from its opposite side edges to form tongues 4, and the tongues 4 at opposite edges of the strip are rolled inwardly to provide tapering retaining sections 5 at the outer end of each tongue, the channel sections being telescopically connected throughout the length of the strip. In order to increase the stiffness of the strip, the continuous central portion of the strip may be bent along longitudinal lines to provide a longitudinal stiffening member such as the rib 16. The strip shown in Fig. 9 is bendable in its plane in either direction and the telescopically connected channel sections 5 provide continuous retaining channels for the cushioning member 6 throughout the length of the strip.

Fig. 11 shows a modified construction in which the strip has a contractible edge portion provided with a retaining channel formed by telescopically connected channel sections 17 and 18 formed at the outer ends of tongues 19 and 20. The channel sections 17 and 18 are substantially cylindrical in form, the sections formed at the outer ends of the tongues 19 being of larger diameter than the channel sections 18 formed at the ends of the tongue 20 and telescopically receiving the ends of the tongues 20. The tongues 19 are offset slightly with respect to the plane of the strip so that the edges of the tongues 20 overlap the adjacent tongues 19 on the same side of the strip, and the inner edges of the channel sections 17 of the tongues 19 are spaced sufficiently from the body of the strip to permit the tongues 20 to slide on the tongues 19 when the strip is bent.

The method of forming the strip shown in Fig. 11 is illustrated in Figs. 12 and 13. The first step consists of striking up the tongues 19 from the body of the strip and applying pressure to the outer ends of one or both of the strips 19 and 20 to widen the outer ends thereof. The tongues 19 are then bent back against the tongues 20 as shown in Fig. 13, and the ends of the tongues are then rolled to form the telescopically joined bead or channel sections 17 and 18.

In manufacturing flat trim strips or weatherstrips such as shown in Figs. 1, 7, 9 and 11, a sheet metal blank is preferably formed with tongues along opposite side edges thereof and, where the strip is bendable in one direction only, the blank is of a width such that two identical strips may be formed from the halves of the blank obtained by severing the blank along its longitudinal center line. A bendable window channel can be made from blanks similarly formed by bending the continuous central portion of the strip along parallel longitudinal lines to dispose the contractible edge portions in flanges which are disposed at substantially right angles to the base of a channel. The flanges of the channel so formed are bendable in the planes thereof and the overlapping tongues are slidable one upon another to allow contraction of the edges of the flanges in exactly the same way as in the flat strips. The web of the channel being substantially flat is bendable to conform to the curvature to which the channel is bent.

Fig. 14 shows a window channel in which the flanges are provided with tongues 4 having their edges bent to provide tapering channel sections 5 which are disposed with the small edge of one section telescoping into the large end of the next adjacent section. The channel shown in Fig. 14 may be made from a blank such as shown in Fig. 15 which corresponds to the blank shown in Fig. 5 except that the central continuous portion 7 is made of a width suitable for the base of the channel, and the tongues 4 are of the length required to provide flanges of the desired depth.

In Fig. 16 of the drawings a modified construction is shown in which the strip is provided with overlapping tongues having tapering telescopically connected channel sections 5 at the edge thereof and in which the continuous body portion of the strip has a longitudinal stiffening member in the form of a plurality of superposed folds 22 formed by bending the body portion upon itself along longitudinal lines. Cushioning and sealing means similar to that shown in Figs. 1, 9 and 11 may be applied to the strip shown in Fig. 16, the cushioning means comprising a fiber filler strip 23 bearing against the body of the sheet metal strip, and a deep pile fabric 24 covering the filler strip 23, the pile fabric 24 having edge hems 25 that are retained within the proposed channels 2 and 5 of the strip.

Fig. 17 of the drawings shows a sheet metal strip suitable for a window channel base in which the body portion of the strip has longitudinal reinforcing members 26 at the opposite sides of the base of the channel which are formed by bending the body of the strip to form superposed folds. Aside from the folds 26, the channel shown in Fig. 17 is formed in the same manner as the channel shown in Fig. 14, the flanges being made contractible by means of overlapping tongues 4 and telescoping channel sections 5.

In Figs. 18 and 19 a window channel base is shown having flanges formed in the same manner as the channels shown in Figs. 14 and 17 but having transversely extending indentations which form stiffening ribs 27 at the juncture of the flanges with the base of the channel.

If an overlap of considerable width at the edges of the tongues is desired such an overlap may be provided by forming elongated transverse indentations in the sheet metal blank, slitting the blank transversely to form the tongues and widening the tongues by flattening portions of the indentations. By making the indentations of a length greater than the overlap and flattening only a portion of each indentation, reinforcing ribs may be provided in the completed strip. Several variations of the method referred to are shown in Figs. 20 to 27 inclusive.

In forming the strip by the method illustrated in Figs. 20 to 23 inclusive, regularly spaced elongated transverse indentations 28 are formed in the blank that extend from the edges toward the center at right angles to the edges. Slits 29 intermediate the indentations and parallel thereto form the tongues. By flattening the strip along the outer ends of the tongues, the outer ends of the tongues are widened and caused to overlap as shown in Figs. 21 and 22. Blanks such as shown in Fig. 21 may be severed along a center line to provide blanks for flat strips such as shown in Fig. 23 or may be bent to form a window channel of the type shown in Fig. 14. The inner portions of the indentations 28 are not disturbed, so that the finished strip is reinforced by the indentations which form transverse stiffening ribs in the body of the strip as shown in Fig. 23.

Instead of forming the slits between the indentations as shown in Figs. 20 and 21, the slits may be formed centrally of the elongated indentations as shown in Fig. 24, where the blank is provided with indentations 30 and slits 31 which are disposed centrally of the indentations, but which terminate short of the inner ends of the indentations as shown in Fig. 25. As in the modification previously described, the outer ends of the tongues are widened and overlapped by flattening the indentations previously formed in the strip. The blank shown in Fig. 24 may be severed along a center line to provide blanks for strips such as shown in Fig. 25 or may be bent to form a channel of the type shown in Fig. 14. The inner portions of the indentations 30 which are not flattened provide stiffening ribs.

In Fig. 26 of the drawings a blank is formed which is the same as the blank shown in Fig. 21 except that the slits 32 and the indentations 33 are disposed diagonally instead of at right angles to the side edges of the strip. As in the modifications previously described, the central portion of the blank is longitudinally continuous and the strip may be severed along the longitudinal center line after the slitting, indenting and flattening operations have been performed, or may be bent to channel form.

Fig. 27 of the drawings illustrates a method in which the lapping tongues are formed in the central portion of the blank. In forming the strip by this method, slits 34 are transversely disposed and extend across the major portion of the width of the strip, but terminate short of the side edges of the strip. Between the slits, transverse indentations 35 are formed which also terminate short of the side edges of the strip, and the central portions of the transverse indentations 35 lying between the slits 34 are flattened to widen the webs between the indentations and cause them to overlap, as indicated at 36 centrally of the strip. After the flattening of the indentations, the strip may be severed along a longitudinal center line to provide two blanks substantially identical with the blanks formed by severing of the strip shown in Fig. 21.

It is to be understood that in accordance with the provisions of the patent statutes, variations and modifications of the specific devices herein shown and described may be made without departing from the spirit of the invention.

What I claim is:

1. A bendable base for weather or trim strips comprising a strip of sheet material having a longitudinally continuous portion and a contractible portion formed by tongues each of which consists of a single thickness of said material integral with said continuous portion and extending from said continuous portion to a longitudinal edge of the strip, said tongues having side edges disposed in lapping relation when the strip is straight, said lapped edges of the tongues being slidable one upon another to permit bending of the strip in the plane of the contractible portion to curve said longitudinal edge.

2. A bendable base for weather or trim strips comprising a strip of sheet material having a longitudinally continuous portion and a contractible portion formed by tongues each of which consists of a single thickness of said material integral with said continuous portion and extending from said continuous portion to a longitudinal edge of the strip, the outer end portions of said tongues being wider than the inner portions thereof and disposd in lapping relation along the longitudinal edge formed by the tongues when said longitudinal edge is straight, the lapped edges of the tongues being slidable one upon another to permit bending of the strip in the plane of the contractible portion to concave said longitudinal edge.

3. A bendable base for weather or trim strips comprising a strip of sheet material having a longitudinally continuous portion and a contractible portion formed by tongues integral with said continuous portion and extending from said continuous portion to a longitudinal edge of the strip, said tongues having side edges disposed in lapping relation when the strip is straight, said contractible portion being bent to provide a longitudinal retaining channel composed of telescopically connected sections that are slidable one upon another.

4. A bendable base for weather or trim strips comprising a strip of sheet metal having a longitudinally continuous portion and a contractible portion formed by tongues integral with said continuous portion and extending from said continuous portion to a longitudinal edge of the strip, said tongues having side edges disposed in lapping relation when the strip is straight, said contractible portion being bent to provide a longitudinal retaining channel along the contractible edge of the strip, the bent portions of the tongues forming telescopically connected channel sections.

5. A sheet metal strip such as set forth in claim 4 provided with elongated transversely extending indentations forming reinforcing ribs inwardly of the retaining channel.

6. A sheet metal strip such as set forth in claim 4 in which an elongated transversely disposed indentation is provided in the longitudinally continuous portion inwardly of the tongues.

7. A bendable base for weather or trim strips comprising a sheet metal strip having a longitudinally continuous portion and a contractible portion having transverse slits forming tongues integral with the continuous portion and extending from the continuous portion to a longitudinal edge of the strip, said tongues having outer end portions of a width greater than the inner end portions thereof and disposed in lapping relation, the contractible portion of said strip being bent to provide a longitudinal retaining channel facing inwardly toward the inner ends of the tongues, the lapping portions of the tongues forming tapering telescopically connected channel sections.

8. A bendable base for weather or trim strips comprising a strip of sheet material having a longitudinally continuous central portion and contractible edge portions formed by tongues integral with said continuous central portion and extending to opposite longitudinal edges of the strip, said tongues having edge portions adjacent their outer ends disposed in lapping relation when the strip is straight, said contractible edge portions being bent to provide longitudinal retaining channels that face inwardly toward said continuous portion of the strip, the bent portions of the tongues forming telescopically connected sections of the retaining channels.

9. A bendable base for weather or trim strips such as defined in claim 8 which is of channel form and in which the said contractible edge portions form the flanges of the channels.

10. A bendable base for weather or trim strips comprising a strip of sheet material having a longitudinallly continuous portion bent along longitudinal lines to provide a longitudinally extending stiffening member therein and a contractible portion formed by tongues integral with said continuous portion and extending from said continuous portion to a longitudinal edge of the strip, said tongues having side edges disposed in lapping relation when the strip is straight, said contractible portion being pent to provide a longitudinal retaining channel along the contractible edge of the strip, the bent portions of the tongues forming telescopically connected channel sections.

11. A bendable base for weather or trim strips such as defined in claim 10 in which the longitudinal stiffening member in the longitudinally continuous portion of the strip is composed of superimposed folds in the sheet material.

12. A bendable base for weather or trim strips comprising a strip of sheet material having a longitudinally continuous portion and a contractible portion formed by tongues integral with said continuous portion and extending from said continuous portion to a longitudinal edge of the strip, each tongue being wider at its outer end than at its inner end and each tongue having its opposite side edges lapping adjacent tongues on the same side and at the outer ends thereof, each tongue being bent to provide a channel portion at its outer end, each channel portion being of uniform size from end to end and alternate tongues having channel portions of a size to telescopically receive the channel portions of intermediate tongues.

OLIVER B. MERRILL.

REFERENCES CITED

The following references are of record in the file of this patent:

UNITED STATES PATENTS

| Number | Name | Date |
| --- | --- | --- |
| 1,175,236 | Cary | Mar. 14, 1916 |
| 1,936,909 | MacChesney | Nov. 28, 1933 |
| 2,254,558 | Williams | Sept. 2, 1941 |
| 2,434,504 | Merrill | Jan. 13, 1948 |
| 2,449,000 | Merrill | Sept. 7, 1948 |
| 2,475,332 | Merrill | July 5, 1949 |
| 2,479,016 | Merrill | Aug. 16, 1949 |